(12) United States Patent
Morikuni (10) Patent No.: US 9,372,328 B2
(45) Date of Patent: Jun. 21, 2016

(54) PROJECTION SYSTEM AND PROJECTOR

(71) Applicant: Seiko Epson Corporation, Tokyo (JP)

(72) Inventor: Eiji Morikuni, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 14/194,469

(22) Filed: Feb. 28, 2014

(65) Prior Publication Data

US 2014/0176919 A1    Jun. 26, 2014

Related U.S. Application Data

(63) Continuation of application No. 12/962,954, filed on Dec. 8, 2010, now abandoned.

(30) Foreign Application Priority Data

Jan. 4, 2010   (JP) .................................. 2010-000101

(51) Int. Cl.
| | |
|---|---|
| *G02B 17/08* | (2006.01) |
| *G03B 21/14* | (2006.01) |
| *H04N 9/31* | (2006.01) |
| *G03B 21/28* | (2006.01) |

(52) U.S. Cl.
CPC .............. *G02B 17/08* (2013.01); *G03B 21/147* (2013.01); *G03B 21/28* (2013.01); *H04N 9/3102* (2013.01)

(58) Field of Classification Search
CPC .... G03B 21/00; G03B 21/142; G03B 21/147; G03B 21/2066; G03B 21/208; G03B 21/28; G02B 13/0095; G02B 13/16; G02B 13/22–13/26; G02B 17/00; G02B 17/008; G02B 17/08–17/0804; G02B 17/0812–17/0816; G02B 17/0856–17/086; G02B 27/18; H04N 9/3173
USPC ........... 353/37, 50, 51, 66, 67, 73, 77, 78, 98, 353/99; 359/364–366, 433, 434, 727–728, 359/730, 732
See application file for complete search history.

(56) References Cited

U.S. PATENT DOCUMENTS

| | | | |
|---|---|---|---|
| 6,898,025 B2 * | 5/2005 | Takeuchi et al. .............. | 359/732 |
| 7,001,026 B2 | 2/2006 | Rudolph et al. | |
| 7,159,988 B2 | 1/2007 | Yatsu et al. | |
| 2006/0158615 A1 | 7/2006 | Williamson | |

FOREIGN PATENT DOCUMENTS

JP       2005-157153 A     6/2005

* cited by examiner

*Primary Examiner* — Stephone B Allen
*Assistant Examiner* — James McGee
(74) *Attorney, Agent, or Firm* — Maschoff Brennan (57) ABSTRACT

A projection system includes: a relay system that focuses light having exited through a first image plane on a second image plane; and an enlarging system that enlarges and projects an image focused on the second image plane on a third image plane, wherein the relay system includes a first lens element on which the light having exited through the first image plane is incident, the first lens element having positive refracting power, a reflective member that reflects a light having passed through the first lens element, the reflective member having positive refracting power, and a second lens element on which a light reflected off the reflective member is incident and which focuses the light reflected off the reflective member on the second image plane, the second lens element having positive refracting power.

12 Claims, 9 Drawing Sheets

PROJECTION SYSTEM AND PROJECTOR

CROSS-REFERENCE TO RELATED APPLICATIONS

This application is a continuation of U.S. patent application Ser. No. 12/962,954, filed Dec. 8, 2010, which claims priority to Japanese Patent Application No. 2010-000101, filed Jan. 4, 2010. The foregoing applications are incorporated by herein by reference.

BACKGROUND OF THE INVENTION

1. The Field of the Invention

The present invention relates to a projection system and projector.

2. The Relevant Technology

As an apparatus capable of displaying a large screen image, there has been a commercially available projector in which light from a light source apparatus illuminates a small light modulator that forms an optical image in accordance with image information and the optical image is enlarged and displayed through a projection lens on a screen or any other suitable surface.

In recent years, the performance of projectors has significantly progressed. Such high performance owes greatly to an optical system of a projector. For example, an ultra-short focal length optical system and a high magnification optical zooming system allow a user to use a projector more comfortably, and a rigorously designed optical system substantially free of lens aberrations allows the resolution of an image to be increased.

To incorporate more advanced features, it is more difficult to design an optical system that satisfies the requirements. On the other hand, attempts to design an optical system having excellent performance quality tend to end up increase in size of the optical system. As a result, the overall size of a projector increases, which is against market requirements of reduction in size of a projector and hence contributes to decrease in value for customers.

To address the problem, many studies have been conducted on reduction in size of an optical system (see JP-A-2005-157153, for example). In JP-A-2005-157153, a relay system disposed between an image display device (panel) and a projection lens is used to form an intermediate image magnified to be larger than the panel and located on the object side (panel side) of the projection lens, whereby the f-number (an index representing the brightness expressed by the ratio of the focal length of a lens to the diameter of an entrance pupil) is increased. As a result, the back focal length can be reduced, and an ultra-wide angle projection lens is achieved.

The method described above, however, has the following problem: That is, when a relay system capable of displaying a high-definition image is required, a large number of lenses are used to design the optical system, as described in JP-A-2005-157153, probably resulting in an increased length of the overall optical system including the projection lens. Further, an optical system is, in general, designed in consideration of aberrations induced by the lenses used in the optical system, and the design tends to be complicated when the number of lenses that form the optical system increases. When an optical system in question is a telecentric relay system, the design is much more complicated.

BRIEF SUMMARY OF THE INVENTION

An advantage of some aspects of the invention is to provide a projection system having a simple structure but capable of displaying a high-definition image. Another advantage of some aspects of the invention is to provide a projector including the projection system.

A projection system according to an aspect of the invention includes a relay system that focuses light having exited through a first image plane on a second image plane and an enlarging system that enlarges and projects an image focused on the second image plane on a third image plane. The relay system includes a first lens element on which the light having exited through the first image plane is incident, the first lens element having positive refracting power, a reflective member that reflects a light having passed through the first lens element, the reflective member having positive refracting power, and a second lens element on which a light reflected off the reflective member is incident and which focuses the incident light reflected off the reflective member on the second image plane, the second lens element having positive refracting power.

According to the configuration described above, since the reflective member is used to fold the optical path, the overall length of the relay system can be set not to be long, but the configuration of the relay system can be compact. Further, the reflective member does not produce color aberrations. Providing the relay system described above allows the projection system to be compact and free of color aberrations.

In the aspect of the invention, a principal ray of a light that is incident on the first lens element is desirably parallel to a principal ray of a light that exits through the second lens element.

According to the configuration described above, when other optical systems are disposed upstream and downstream of the projection system, assembly and adjustment thereof is readily carried out because the directions of the principal rays of the incident and exiting light are aligned.

In the aspect of the invention, the projection system desirably further includes a first reflection mirror that not only reflects the light having passed through the first lens element such that the light having passed through the first lens element is guided to the reflective member but also reflects a light reflected off the reflective member such that the light reflected off the reflective member is guided to the second lens element.

In the aspect of the invention, the projection system desirably further includes a second reflection mirror that reflects a light having passed through the second lens element.

According to the configuration described above, since the degree of freedom in setting the position where the second image plane is formed increases, a downstream optical system is readily connected to the relay system while preventing interference with other members from occuring. As a result, the projection system can have a high degree of freedom in terms of position where it is located.

In the aspect of the invention, a shape of the first lens element is the same as a shape of the second lens element, and a refractive index of the first lens element is the same as a refractive index of the second lens element.

According to the configuration described above, since a single common lens element can be used, the number of members to be prepared can be reduced.

In the aspect of the invention, it is desirable that the reflective member has a plane-symmetrical shape that is symmetric with respect to a symmetry plane including the optical axis of the reflective member, and that the first lens element and the second lens element are disposed to be symmetric with respect to the symmetry plane.

According to the configuration described above, since the lens elements are disposed to be symmetric with respect to the symmetry plane, a light ray having exited through the first lens element readily incident on the position on the second lens element that corresponds to the position on the first lens element through which the light ray has exited, whereby color aberrations can be canceled in a satisfactory manner.

In the aspect of the invention, it is desirable that the first lens element and the second lens element constitute a single lens member having positive refracting power. It is also desirable that the lens member has a shape rotationally symmetric around an optical axis thereof, and that the reflective member has a shape rotationally symmetric around the optical axis of the lens member.

According to the configuration described above, since the first lens element and the second lens element constitute a single lens member, a light ray having exited through the first lens element readily incident on the position on the second lens element that corresponds to the position on the first lens element through which the light ray has exited, whereby color aberrations are canceled in a satisfactory manner. Further, since the symmetry axis of the lens member coincides with the symmetry axis of the reflective member, the members are readily aligned with each other. Moreover, since the number of components is reduced, the configuration of the projection system can be simplified, and assembly and adjustment thereof can be readily carried out.

In the aspect of the invention, the light incident on the first lens element desirably travels in a telecentric manner.

According to the configuration described above, the shape of the image in the second image plane does not change even when the first image plane is slightly inclined with respect to the optical axis of the first lens element, whereby the projection system acts in a satisfactory manner.

In the aspect of the invention, it is desirable that a light having exited through the second lens element travels in a telecentric manner, and that the second image plane is inclined to the first image plane.

In the relay system in the projection system according to the first aspect of the present application, it is required to fabricate the lens element with high accuracy considering the aberrations induced by the lens element, when telecentricity of the light having exited through the second lens element is desired. Further, it is required to fabricate the lens element with higher accuracy in order to locate the first image plane and the second image plane in the same plane. In this case, the configuration of the projection system may not be simple. To address the problems, in the projection system according to the aspect of the invention, the first image plane and the second image plane are inclined to each other so that the advantageous effect of the invention is achieved without complicated fabrication of the lens element.

In the aspect of the invention, the projection system desirably further includes a light level adjusting member disposed in an optical path between the first lens element and the reflective member, the light level adjusting member limiting the amount of light incident on the reflective member.

According to the configuration described above, the light having exited from the first image plane can be uniformly limited.

In the aspect of the invention, the projection system desirably further includes a first optical member which is disposed between the first image plane and the first lens element and through which the light having exited from the first image plane passes and a second optical member disposed between the second lens element and the second image plane, the second optical member allowing an optical distance between a surface of the second lens element through which light exits and the second image plane to be equal to an optical distance between the first image plane and the first lens element.

According to the configuration described above, the optical distance from the first image plane to the first lens element is equal to the optical distance from the surface of the second lens element through which light exits to the second image plane, for example, even when a dichroic prism or any other light transmissive member is used as the first optical member. Consequently, aberrations induced by the optical member are canceled by the second optical member, and hence distortion and color aberrations can be suppressed.

In the aspect of the invention, a refractive index of the first optical member is desirably equal to a refractive index of the second optical member.

According to the configuration described above, the optical distance from the first image plane to the first lens element can readily be accurately equal to the optical distance from the surface of the second lens element through which light exits to the second image plane in an accurate manner, whereby distortion and color aberrations can be suppressed.

In the aspect of the invention, the second optical member desirably has a reflection layer that reflects the light having passed through the second lens element.

According to the configuration described above, the projector can have a high degree of freedom in positioning the components.

A projector according to another aspect of the invention includes a light source, a light modulator which is provided in the first image plane and on which light emitted from the light source is incident, and the projection system described above.

According to the configuration described above, the projector can have a short back focal length and display a high-quality image.

BRIEF DESCRIPTION OF THE DRAWINGS

The reference to the accompanying drawings, wherein like numbers references like elements.

DETAILED DESCRIPTION OF THE PREFERRED EMBODIMENTS

Projection systems and projectors according to embodiments of the invention will be described below with reference to FIGS. 1 to 9. In the following drawings, the dimensions, aspect ratios, and other factors of components are not to scale as appropriate for ease of illustration.

Figure 1:
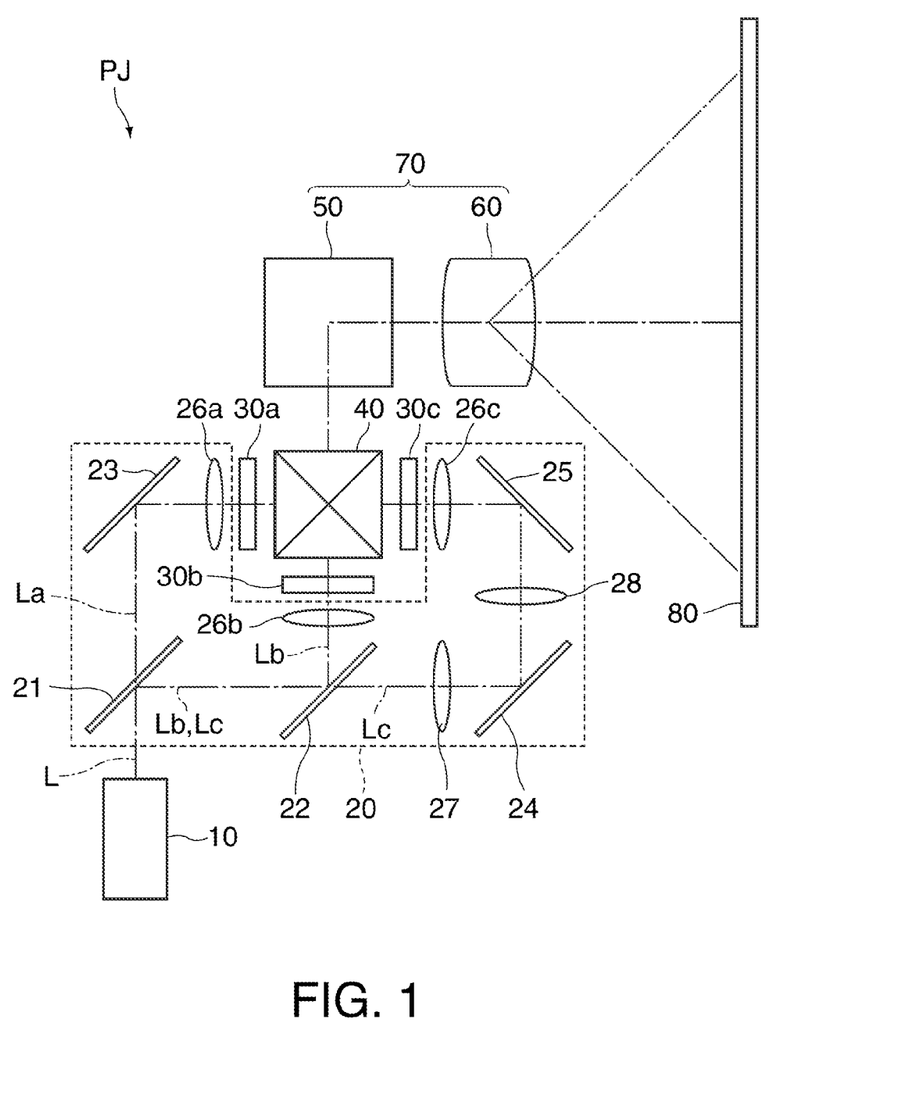
FIG. 1 is a diagrammatic view showing a schematic configuration of a projector according to an embodiment of the invention.

FIG. 1 is a diagrammatic view showing a schematic configuration of a projector PJ including a projection system according to an embodiment of the invention. As shown in FIG. 1, the projector PJ includes an illumination system (light source) 10, a color separation system 20, liquid crystal light valves (light modulators) 30a to 30c, a light combining system 40, a relay system 50, and an enlarging system 60. The relay system 50 and the enlarging system 60 together form a projection system 70.

The projector PJ generally operates as follows: Light L emitted from the illumination system 10 is incident on dichroic mirrors 21 and 22 included in the color separation system 20 and divided into red light La, green light Lb, and blue light Lc, which then travel via mirrors 23, 24, and 25 and lenses 26a to 26c, 27, and 28 and are incident on and modulated by the respective liquid crystal light valves 30a to 30c.

The plurality of color light fluxes modulated by the liquid crystal light valves 30a to 30c are incident on a dichroic prism 40 and combined therein. The light combined in the dichroic prism (first optical member) 40 is enlarged and projected through the projection system 70 on a projection surface (third image plane) 80, such as a wall or a screen. A full-color projected image is thus displayed.

The projection system 70 according to the embodiment of the invention is reduced in size by using a reflective member in the relay system 50 as described below, and the overall length of the projection system 70 is not long. Examples of the relay system 50 included in the projection system 70 will be described in order with reference to FIGS. 2 to 8, and the projection system 70 in the present application including the relay system will then be described.

Figure 2:
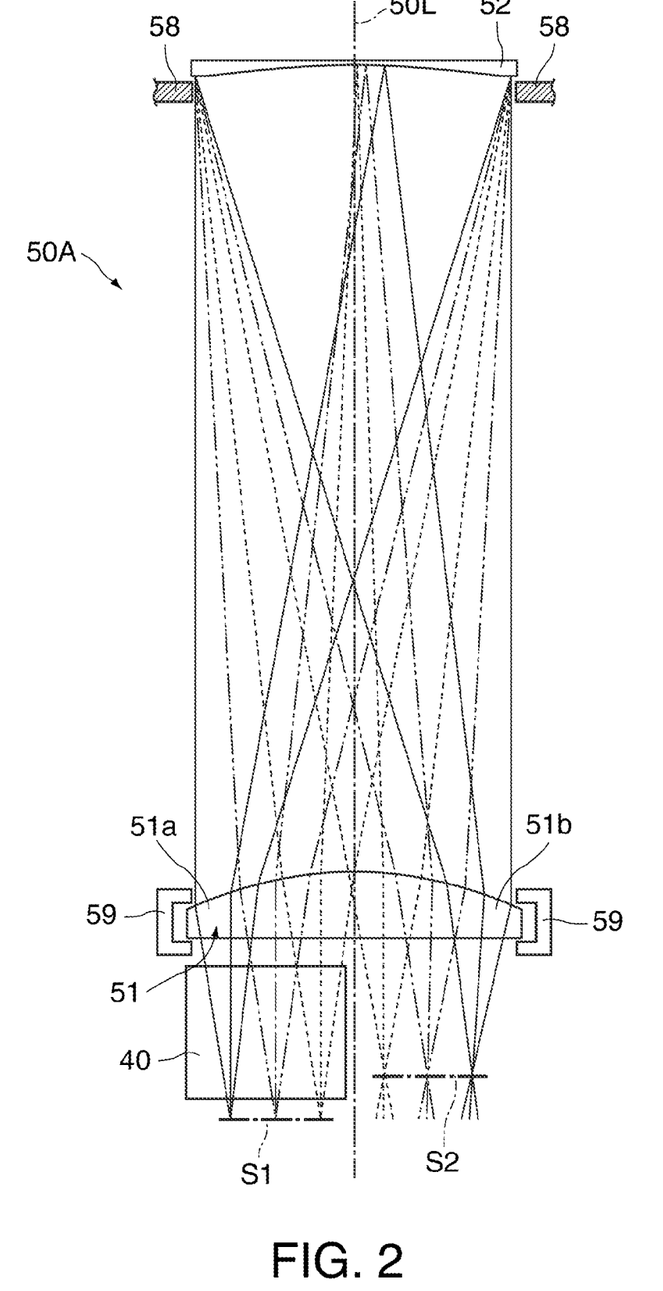
FIG. 2 describes the configuration of a projection system according to the embodiment of the invention.

FIG. 2 describes a basic configuration of the relay system 50 in the projection system according to the embodiment FIG. 2 describes a basic configuration of the relay system 50 in the projection system according to the embodiment The lens member 51 is a plano-convex lens having a curved surface facing the concave mirror 52. The lens member 51 is fixed by using a holder 59 in an appropriate position. The lens member 51 is divided with a plane including the rotational axis 50L into a first lens element 51a disposed on one side and a second lens element 51b disposed on the other side, and a direction in which light passes through the first lens element is opposite to a direction in which light passes through the second lens element. In other words, the first lens element and the second lens element 51a, 51b are disposed symmetrically with respect to the plane including the rotational axis 50L. Further, the light incident on the first lens element 51a and the light incident on the second lens element 51b have principal rays parallel to each other.

The state in which "principal rays are parallel to each other" in the invention conceptually includes a state in which they are slightly out of parallelism due to aberrations induced by the lens member 51.

The concave mirror 52 has a curved surface facing the lens member 51 and reflects the light having passed through the lens member 51 back toward the lens member 51. In detail, the concave mirror 52 reflects a light ray having exited through the first lens element 51a and directs the reflected light to a position on the second lens element 51b that corresponds to the position on the first lens element 51a through which the light ray has exited. "The position on the second lens element 51b that corresponds to the position on the first lens element 51a through which the light ray has exited" used herein is the position on the second lens element 51b that is symmetric to the corresponding position on the first lens element 51a with respect to the plane including the rotational axis 50L, which divides the lens member 51 into the first lens element and the second lens element 51a, 51b.

A diaphragm (light level adjusting member) 58 for adjusting the amount of light may be provided in the vicinity of the surface of the concave mirror 52 on which light is incident. The diaphragm 58 can be a diaphragm that mechanically controls the amount of light, such as a light-blocking plate, or a diaphragm that electrically controls the amount of light, such as a liquid crystal device. Providing the diaphragm 58 in this position allows the light having exited from a first image plane S1 to be uniformly limited. The diaphragm 58 employed in the relay system 50A of the present embodiment adjusts its aperture size by mechanically driving a light-blocking plate. In this configuration, a displayed bright image can be brighter by opening the diaphragm 58, whereas a displayed dark image can be darker by closing the diaphragm 58. In this way, an image can be displayed with an appropriate amount of light according to the grayscales of the image, whereby an image having a wide dynamic range can be displayed.

In the thus configured relay system 50A, the light having exited from the first image plane S1 passes through the first lens element 51a and impinges on the concave mirror 52. The light reflected off the concave mirror 52 then passes through the second lens element 51b and is focused on a second image plane S2. In the projector PJ shown in FIG. 1, one of the liquid crystal light valves is disposed in the position of the first image plane S1, and the dichroic prism 40 is disposed between the first image plane S1 and the first lens element 51a in a position facing the first lens element 51a.

In the relay system 50A, when light passes through the first lens element 51a, the light is degraded by color aberrations, but when the light passes through the second lens element 51b, the color aberrations are canceled. On the other hand, no color aberration is produced by the concave mirror 52. Consequently, color aberrations can be suppressed in the relay system 50A.

In the relay system 50A, since the optical path is folded by the concave mirror 52, the overall length of the relay system 50A is not long but has a compact configuration. Further, to achieve a bilateral telecentric relay system, in general, it is necessary to employ a configuration in which a large number of lenses are combined, as described in JP-A-2005-157153. However, since the relay system 50A is primarily formed of the lens member 51 and the concave mirror 52, a bilateral telecentric relay system is achieved by using a smaller number of components.

The projection system according to the embodiment of the invention including the relay system 50A described above can be reduced in size, and color aberrations can be suppressed.

A variety of components can be added to the basic configuration of the relay system of the present embodiment shown in FIG. 2.

Figure 3:
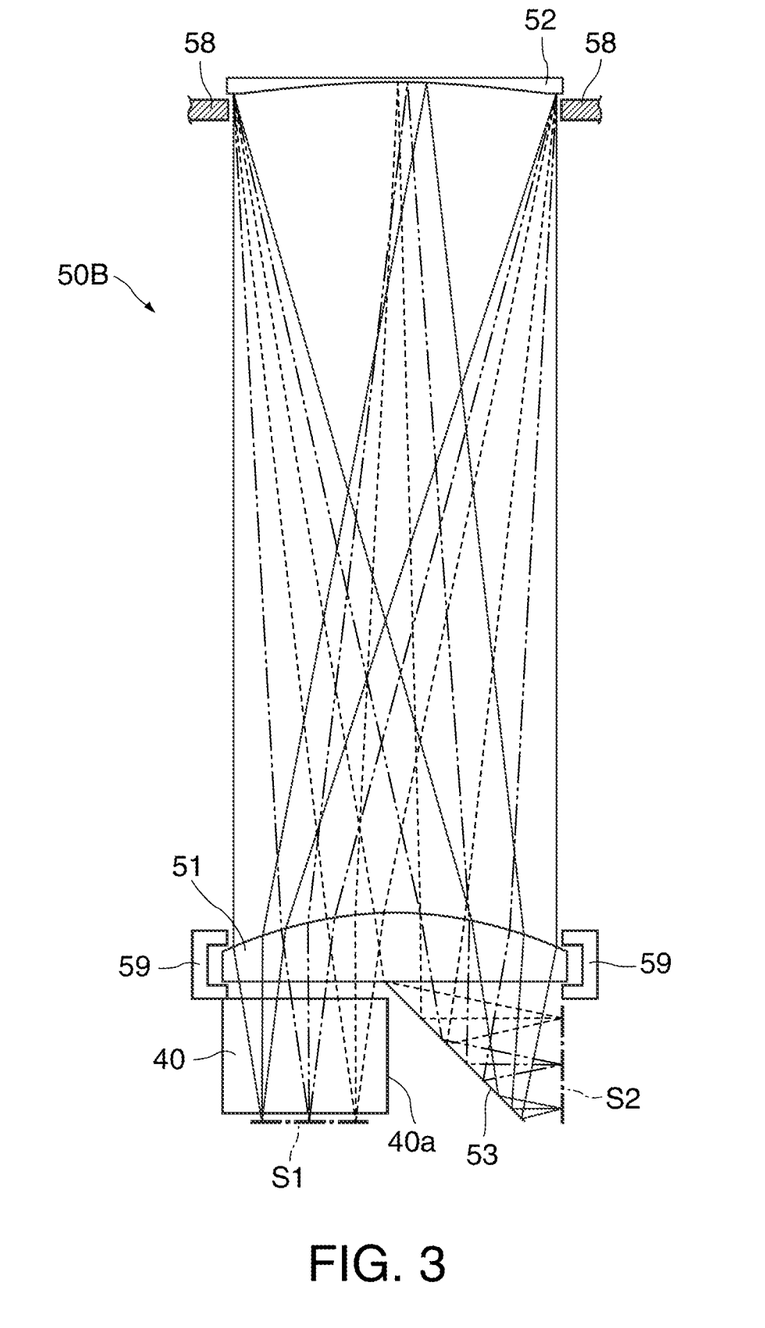
FIG. 3 describes the configuration of another projection system according to the embodiment of the invention.

For example, in a relay system 50B shown in FIG. 3, a reflection mirror (second reflection mirror) 53 that reflects the light having passed through the second lens element 51b may be disposed in a position facing the second lens element 51b to change the direction in which the exiting light travels so that the position of the second image plane S2 is changed. The thus configured relay system can have a high degree of freedom in terms of position where it is located. Specifically, one of the liquid crystal light valves is readily disposed in a position facing a surface 40a of the dichroic prism 40.

Figure 4:
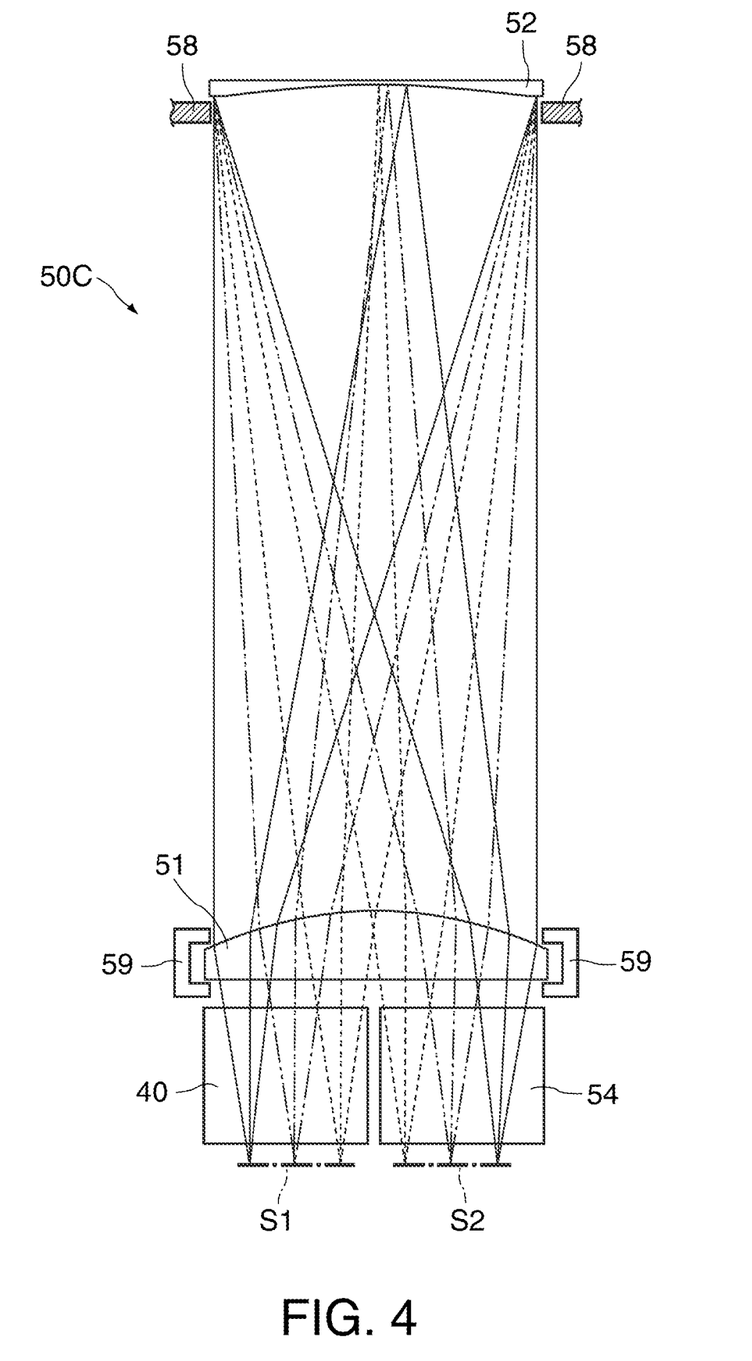
FIG. 4 describes the configuration of another projection system according to the embodiment of the invention.

Further, in a relay system 50C in shown FIG. 4, a dummy prism (second optical member) 54 having the same shape as that of the dichroic prism 40 and made of a material having the same refractive index as that of the dichroic prism 40 may be disposed in a position facing the second lens element 51b. The configuration described above allows the optical distance from the first image plane S1 to the first lens element 51a to be equal to the optical distance from the surface of the second lens element 51b through which light exits to the second image plane S2, whereby aberrations induced in the dichroic prism 40 are canceled in the dummy prism 54 and hence distortion and color aberrations can be suppressed.

Figure 5:
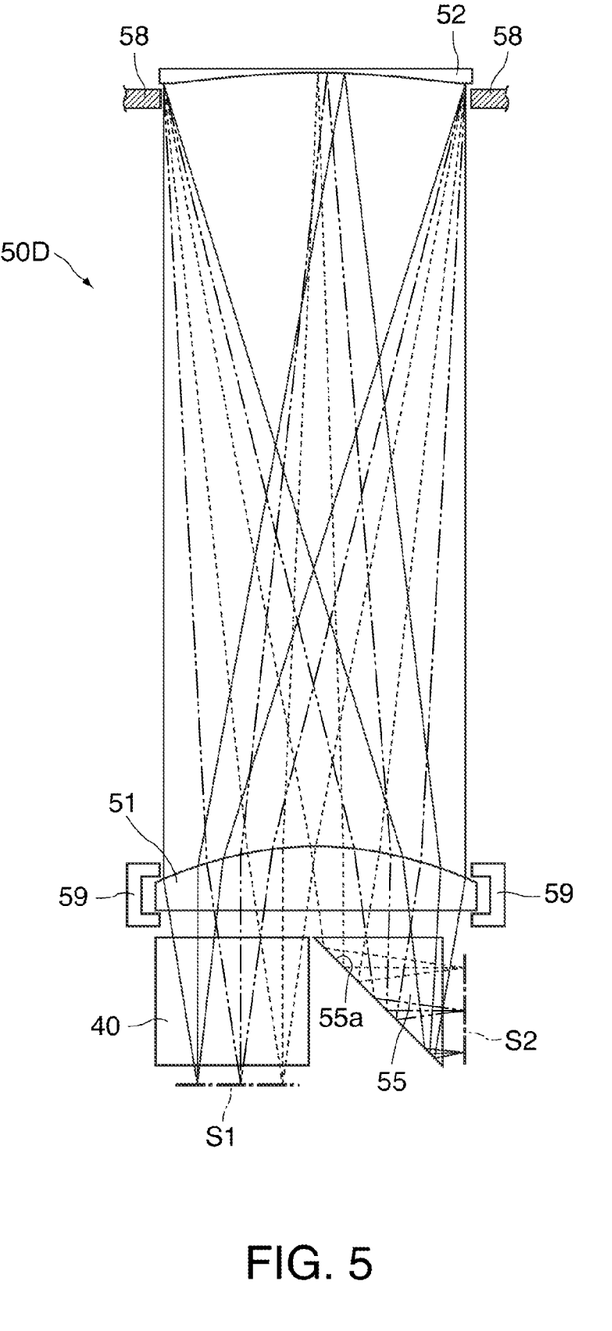
FIG. 5 describes the configuration of another projection system according to the embodiment of the invention.

Further, in a relay system 50D shown in FIG. 5, a triangular prism 55 having a reflection layer 55a may be disposed in a position facing the second lens element 51b. It is preferable that the triangular prism 55 is made of a material having the same refractive index as that of the dichroic prism 40 and has the same geometric length of the optical path as that of the light passing through the dichroic prism 40. The thus configured relay system 50D allows distortion and color aberrations to be suppressed, as in the relay system 50C, and can have a high degree of freedom in terms of position where it is located, as in the relay system 50B.

Figure 6:
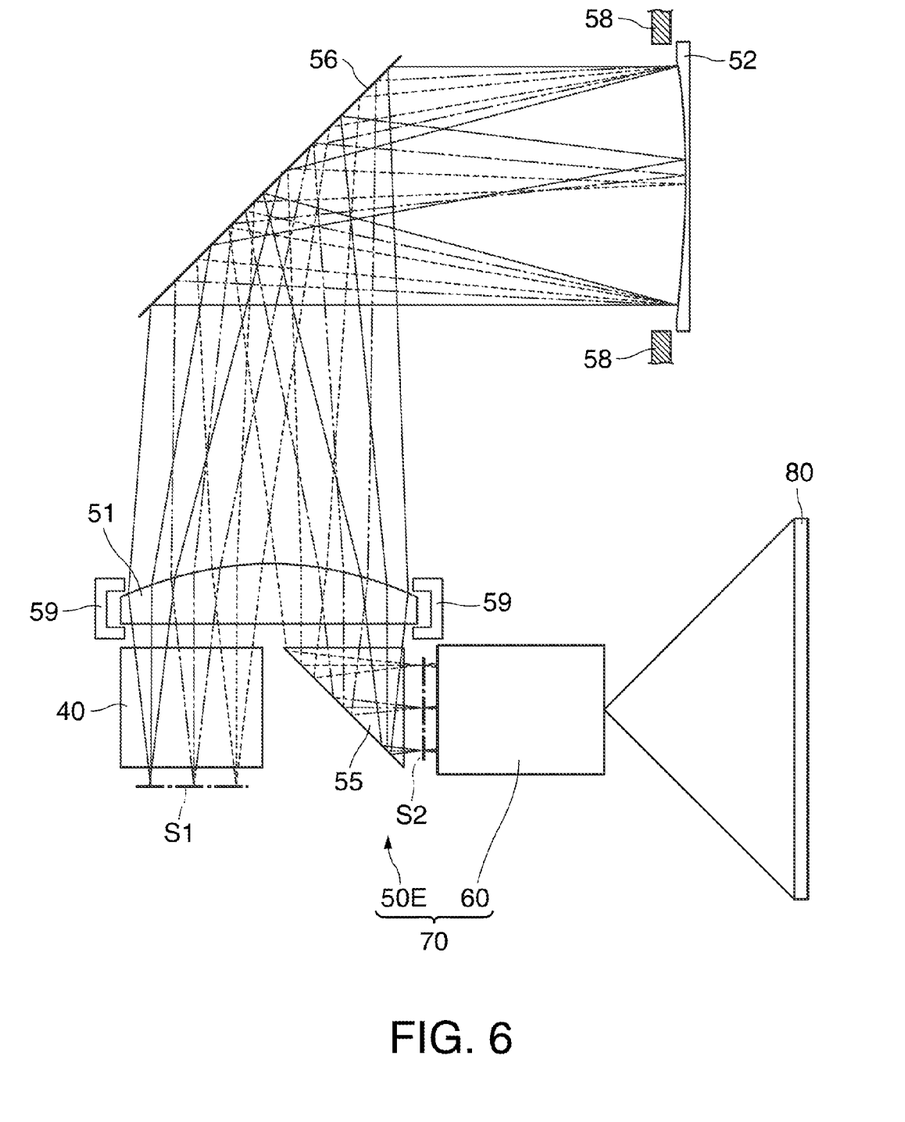
FIG. 6 describes the configuration of another projection system according to the embodiment of the invention.
Figure 7:
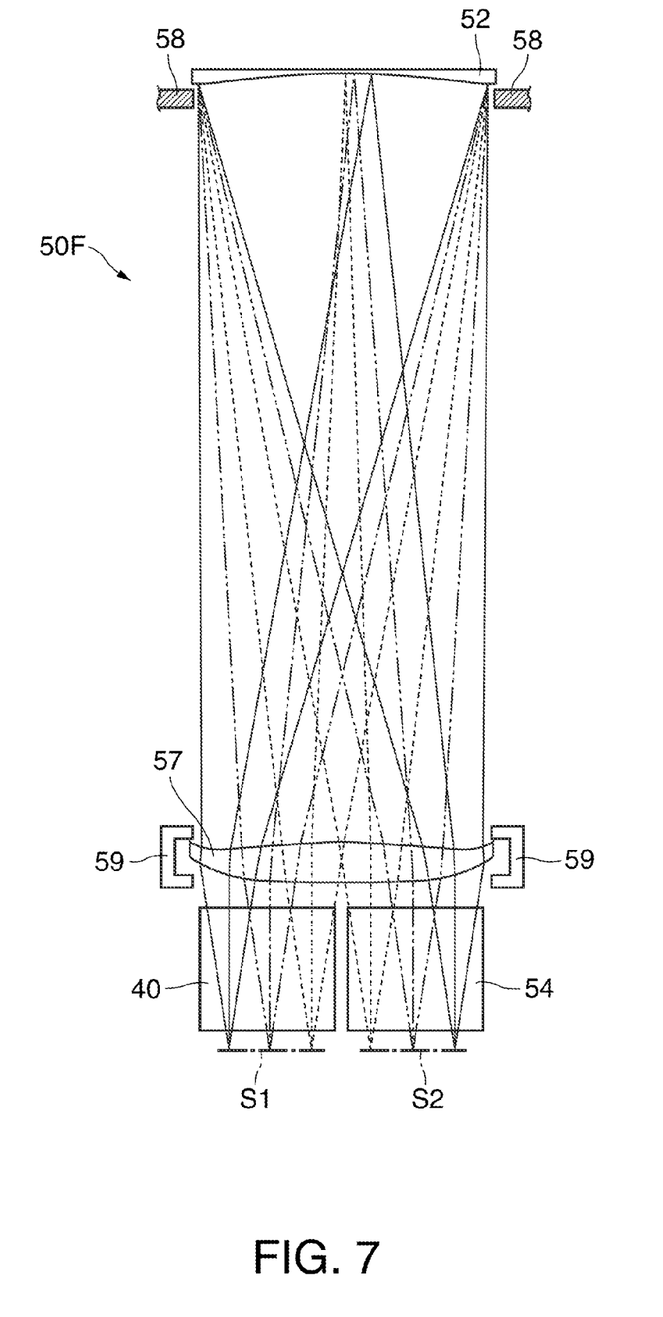
FIG. 7 describes the configuration of another projector system according to the embodiment of the invention.

Further, in a relay system 50E shown in FIG. 6, a reflection mirror (first reflection mirror) 56 may be disposed between the lens member 51 and the concave mirror 52. In the relay system 50E, the optical path of the light having exited through the lens member 51 is deflected by the reflection mirror 56 approximately by 45 degrees. The concave mirror 52, on which the light reflected off the reflection mirror 56 is incident, is disposed on the same side of the optical path connecting the lens member 51 to the reflection mirror 56 as where the projection lens 60 is disposed, and the light guided from the reflection mirror 56 to the concave mirror 52 is reflected not only in the same direction in which the light having exited through the projection lens 60 travels but also in the direction parallel thereto.

That is, it is possible to prevent the distance between the lens member 51 and the concave mirror 52 from being so long by using the reflection mirror 56 to reflect the light having exited through the lens member 51. Further, the components that form the projection system 70 are disposed not to spread two-dimensionally by disposing the concave mirror 52 and the projection lens 60 close to each other.

The entire projection system 70 including the thus configured relay system can be further reduced in size.

The thus configured projection system, in which the reflective member is used to deflect the optical path so that the size of the relay system is reduced, can be compact. In addition, color aberrations can be suppressed in the thus configured projection system.

In the projector including the projection system described above, the apparatus configuration can be compact, and a high-quality image with suppressed color aberrations can be displayed. Further, the problem of a long back focal length can be solved. Consequently, the optical system of the projector has an ultra-short focal length and allows an ultra-high-definition image to be displayed.

In the present embodiment, each of the first lens element 51a and the second lens element 51b is part of the single lens member 51. The lens elements can alternatively be separate elements.

When the first lens element 51a and the second lens element 51b are separated each other, they may have the same shape and the same refractive index, as if the lens member 51 were divided with a plane including the optical axis thereof. Alternatively, the lens elements may, for example, be made of materials having different refractive indices each other as long as the resultant lens elements provide the same refracting power by separately designing their curvatures so that they have difference shapes each other.

When the first lens element 51a and the second lens element 51b are separate elements as described above, the principal optical axis of the light that is incident on the first lens element 51a may not be parallel to the principal optical axis of the light that exits through the second lens elements 51b.

In the present embodiment, the lens member 51 of the relay system is a plano-convex lens having a curved surface facing the concave mirror 52. When the thus configured lens is used, the light that is incident on the first lens element 51a can be telecentric, whereas the light that exits through the second lens element 51b may not be exactly telecentric due to aberrations induced thereby in some cases. When the light that exits through the second lens element 51b should be exactly telecentric, the projection system may include a lens member 57 designed to output exactly telecentric light, for example, a relay system 50F shown in FIG. 7.

Figure 8:
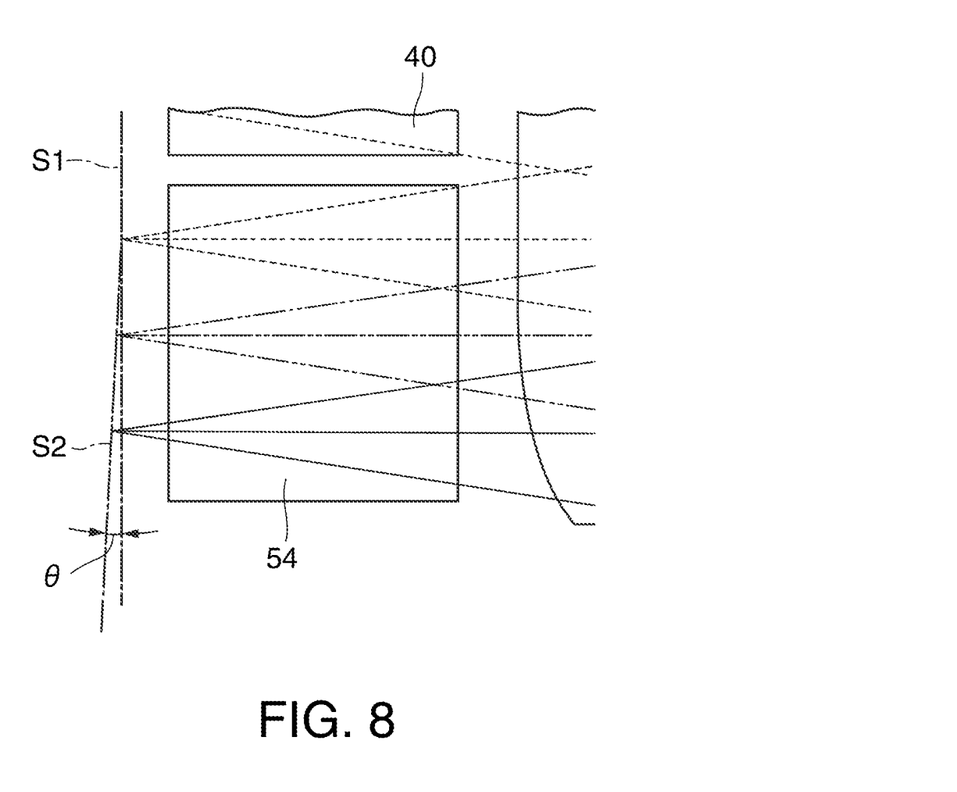
FIG. 8 describes the configuration of another projection system according to the embodiment of the invention.

In this case, the second image plane S2 may be inclined to the first image plane S1 by an angle 0, as shown in FIG. 8. Providing a high-performance bilateral telecentric relay system allows adjustment of positioning a lens (projection lens, for example) in the second image plane S2 to be less difficult.

The inclination angle 0 of the second image plane S2 may be canceled, for example, by employing a projection system including the reflection mirror 53, which reflects light so that an image is projected on the third image plane after the inclination is canceled.

The preferred embodiment according to the invention has been described with reference to the accompanying drawings, but the invention is, of course, not limited thereto. The shapes, combinations, and other factors of the components shown in the embodiment described above have been presented by way of example, and a variety of changes can be made based on design requirements and other factors to the extent that the changes do not depart from the substance of the invention.

For example, the above embodiment has been described with reference to a projector including a projection system. The invention is also applicable to a reduction optical apparatus because the optical path of an optical member can generally be reversed, that is, the optical path of the projection system can be reversed.

Figure 9:
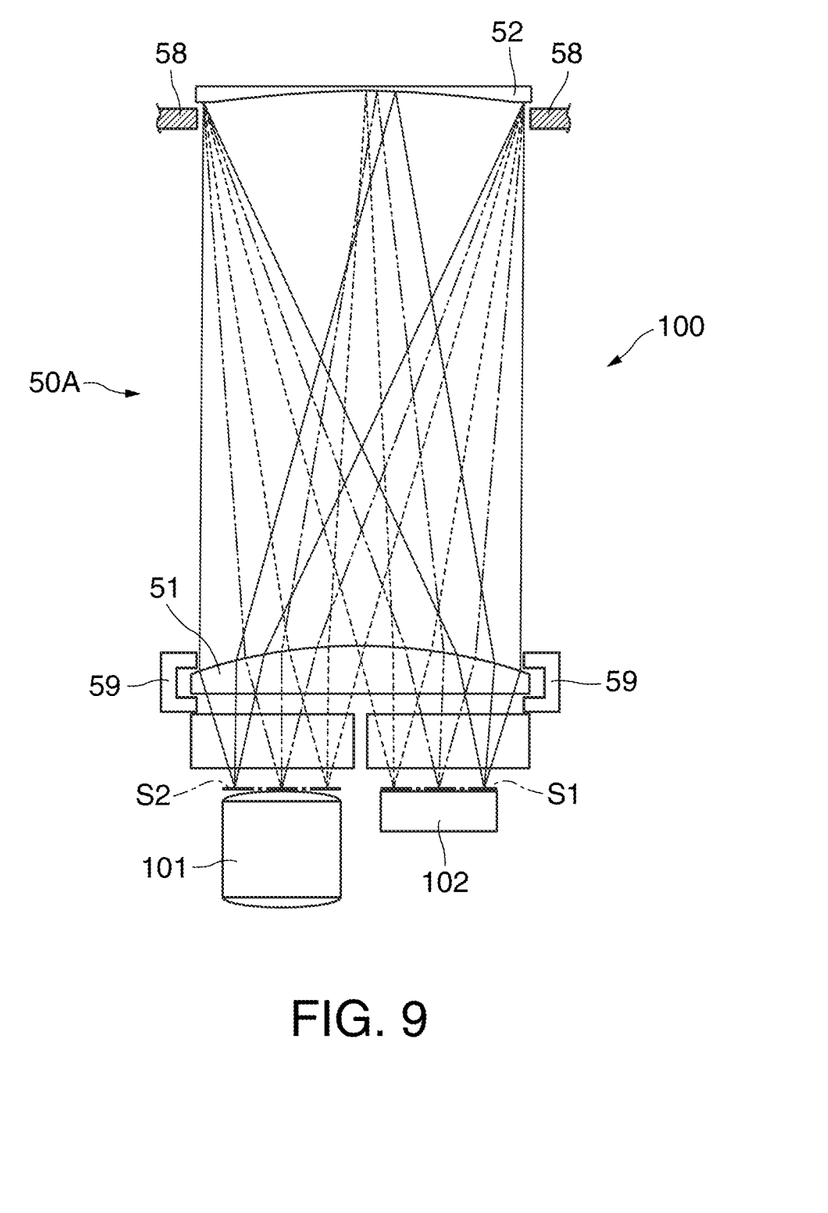
FIG. 9 describes the configuration of a projection system according to another embodiment of the invention.

FIG. 9 is a schematic view showing a camera (imaging apparatus) 100, which is another optical apparatus using the optical system according to the embodiment of the invention. In FIG. 9, the camera 100 includes the relay system 50A shown in FIG. 2. In the camera 100 shown in FIG. 9, an image of an object (third image plane, not shown) which is imaged on the second image plane S2 through a lens 101 is imaged on the first image plane S1 through the relay system 50A and captured by an imager 102, which is a CCD sensor, CMOS sensor, or any other photoelectric conversion device disposed in the first image plane S1.

In the thus configured camera 100, since the relay system 50A is reduced in size, the apparatus configuration can be compact, and a captured image is a high-quality image with suppressed color aberrations.

Further, in a lens interchangeable camera, in which dirt, dust, and other unwanted objects on the imager greatly affect an image, the influence of these unwanted objects can be reduced because the first image plane is an aerial image plane. Moreover, since the back focal length is theoretically zero, any lens model can be attached as long as the size of an image is the same.

What is claimed is:
1. A projection system comprising:
a relay system that focuses light having exited through a first image plane on a second image plane;

an enlarging system that enlarges and projects an image focused on the second image plane on a third image plane; and a light level adjusting member comprising a diaphragm which adjusts an amount of light which exits the first image plane, wherein the relay system includes:
- a first lens element on which the light having exited through the first image plane is incident, the first lens element having positive refracting power,
- a reflective member that reflects a light having passed through the first lens element, the reflective member having positive refracting power, and
- a second lens element on which a light reflected off the reflective member is incident and which focuses the light reflected off the reflective member on the second image plane, the second lens element having positive refracting power, wherein the light level adjusting member is positioned in a vicinity of a surface of the reflective member, wherein the second image plane onto which the image is focused is inclined with respect to the first image plane by an angle which is not zero.

2. The projection system according to claim 1, wherein a shape of the first lens element is the same as a shape of the second lens element, and a refractive index of the first lens element is the same as a refractive index of the second lens element.

3. The projection system according to claim 2, wherein the reflective member has a plane-symmetrical shape that is symmetric with respect to a symmetry plane including an optical axis of the reflective member, and the first lens element and the second lens element are disposed to be symmetric with respect to the symmetry plane.

4. The projection system according to claim 3, wherein the first lens element and the second lens element constitute a single lens member having positive refracting power, the lens member has a shape rotationally symmetric around an optical axis thereof, and the reflective member has a shape rotationally symmetric around the optical axis of the lens member.

5. The projection system according to claim 1, wherein a principal ray of a light that is incident on the first lens element is parallel to a principal ray of a light that exits through the second lens element.

6. The projection system according to claim 1, wherein the light incident on the first lens element travels in a telecentric manner.

7. The projection system according to claim 1, further comprising a second reflection mirror that reflects a light having passed through the second lens element.

8. The projection system according to claim 1, further comprising:

a first optical member which is disposed between the first image plane and the first lens element and through which the light having exited from the first image plane passes, and a second optical member disposed between the second lens element and the second image plane, the second optical member allowing an optical distance between a surface of the second lens element through which light exits and the second image plane to be equal to an optical distance between the first image plane and the first lens element.

9. The projection system according to claim 8, wherein a refractive index of the first optical member is equal to a refractive index of the second optical member.

10. The projection system according to claim 8, wherein the second optical member has a reflection layer that reflects the light having passed through the second lens element.

11. The projection system according to claim 1, further comprising a first reflection mirror that not only reflects the light having passed through the first lens element such that the light having passed through the first lens element is guided to the reflective member but also reflects a light reflected off the reflective member such that the light reflected off the reflective member is guided to the second lens element.

12. A projector comprising:

a light source;

a light modulator which is provided in the first image plane and on which light emitted from the light source is incident; and the projection system according to claim 1.

* * * * *